2,795,322

SELECTIVE SOLVENT FOR NORMALLY GASEOUS HYDROCARBONS

William T. Nelson, Bartlesville, Okla., assignor to Phillips Petroleum Company, a corporation of Delaware No Drawing. Application May 25, 1953, Serial No. 357,344

21 Claims. (Cl. 206—.7)

This invention relates to a novel selective solvent for normally gaseous hydrocarbons. In one of its aspects it relates to a novel selective solvent for the separation of normally gaseous, unsaturated hydrocarbons from normally gaseous, less unsaturated hydrocarbons. In one of its more specific aspects, this invention relates to a novel selective solvent for the removal of acetylene from a gaseous hydrocarbon mixture containing a minor portion of acetylene. In another of its more specific aspects, it relates to a method for preparing an acetylene solution for the storage of acetylene. In still another of its more specific aspects, it relates to a method for the recovery of acetylene contained as a minor constituent in a gaseous hydrocarbon mixture.

Acetylene may be produced by thermal treatment of hydrocarbons by a variety of methods. Among such methods are the treatment of hydrocarbons of the methane and ethylene series by controlled pyrolysis, passage of such hydrocarbons through an electric arc, incomplete combustion, and the like.

Acetylene is formed as a minor constituent in refinery streams resulting from cracking, dehydrogenation and other similar reactions involving thermal or catalytic treatment of hydrocarbon fractions or petroleum derivatives. These gaseous streams usually contain a relatively small percentage of acetylene as compared to the other constituents which may be present, such as hydrogen, methane, ethylene, ethane, nitrogen, or the like. A major problem arises in the separation of the several constituents of such gaseous mixtures and particularly the concentration and/or separation of acetylene.

For the recovery of acetylene from gaseous mixtures, the selective solvent action of various compounds and mixtures of compounds have been used. The most commonly employed solvent is acetone; however, other solvents such as the dialkyl formamides, the aliphatic lactones, the esters of polyhydric alcohols, the polyketones, and the like have been either proposed or used. An ideal solvent for acetylene should have the properties of high solubility for acetylene, high selectivity for acetylene over the other constituents of the gaseous mixture, high boiling point, high thermal stability, low vapor pressure at ordinary temperatures and absence of chemical reaction with acetylene or other constituents of the gaseous stream. Although the compounds heretofore suggested for this purpose accomplish acetylene removal and recovery, they do not, in each case, possess all of the above properties and thus there is considerable room for improvement.

A liquid having high solvent power for acetylene is also important in the storage of acetylene in pressure retaining vessels. Acetylene is commonly stored in pressure containers which are partially filled with balsa wood or other absorbent and porous material into which the solvent containing dissolved acetylene is introduced under pressure. The higher the solvent power of the solvent used, the larger is the volume of acetylene which may be introduced in the container at a stated pressure, and solvents of high solvent power are therefore desirable.

In at least one modification of this invention, at least one of the following objects is attained.

It is an object of this invention to provide a selective solvent for acetylene.

Another object is to provide a method for the separation of normally gaseous unsaturated hydrocarbons from normally gaseous less unsaturated hydrocarbons.

Another object is to provide a method for the selective removal and recovery of acetylene from gaseous mixtures.

Another object is to provide a new composition of matter consisting of acetylene dissolved in a novel solvent.

It is still another object to provide selective solvents for normally gaseous unsaturated hydrocarbons in the presence of normally gaseous less unsaturated hydrocarbons.

It is still another object to provide an improved method for storage of acetylene.

Other objects will be apparent to one skilled in the art upon reading this disclosure of the invention.

I have discovered that dialkyl cyanamides are effective selective solvents for separating normally gaseous unsaturated hydrocarbons from normally gaseous less unsaturated hydrocarbons in general and are particularly applicable to the separation of acetylene from gaseous mixtures containing acetylene. The dialkyl derivatives of cyanamides which are applicable in the practice of my invention are those wherein each alkyl radical contains not more than 3 carbon atoms and includes dimethyl cyanamide, diethyl cyanamide, diisopropyl cyanamide, methylethyl cyanamide and the like. Dimethyl cyanamide is preferred as a selective solvent for separating unsaturated hydrocarbons from less unsaturated hydrocarbons.

Although I prefer to use the solvents in my invention for the separation of acetylene from gaseous mixtures containing acetylene, these solvents are also useful for the separation of normally gaseous unsaturated hydrocarbons from normally gaseous less unsaturated hydrocarbons in general. Thus the dialkyl derivatives of cyanamides which are applicable in the practice of my invention can advantageously be used to separate normally gaseous olefins such as ethylene, propylene, and butylenes from gaseous mixtures of such hydrocarbons in admixture with paraffin hydrocarbons such as methane, ethane, propane, and butanes.

The solubilities of acetylene and other gaseous constituents in dimethyl cyanamide and a solvent of the art are given in Table I.

TABLE I

Solubilities of gases in dimethyl cyanamide and acetone at one atmosphere partial pressure and the temperature indicated

| Solvent | at 30° C. | | | at 0° C. | | |
|---|---|---|---|---|---|---|
| | $C_2H_2$ | $C_2H_4$ | $CO_2$ | $C_2H_2$ | $C_2H_4$ | $CO_2$ |
| Dimethyl cyanamide | 11.72 | 1.79 | 4.04 | 24.5 | 2.75 | 7.68 |
| Acetone | 16.4 | 3.00 | 4.1 | | | |

These solubilities are expressed in terms of the Bunsen coefficient, alpha ($\alpha$), which is the milliliters of solute gas, calculated at 760 millimeters of pressure and 0° C., dissolved per milliliter of solvent at one atmosphere partial pressure of solute gas. The selectivity (ratio of solubilities) of dimethyl cyanamide for acetylene over ethylene and acetylene over carbon dioxide is given in Table II and compared to the selectivity of acetone for acetylene over ethylene.

TABLE II

*Selectivity of dimethyl cyanamide and acetone at one atmosphere partial pressure of gas and the temperature indicated*

| Solvent | at 30° C. | | at 0° C. | |
| --- | --- | --- | --- | --- |
| | $\alpha C_2H_2/\alpha C_2H_4$ | $\alpha C_2H_2/\alpha CO_2$ | $\alpha C_2H_2/\alpha C_2H_4$ | $\alpha C_2H_2/\alpha CO_2$ |
| Dimethyl cyanamide | 6.55 | 2.90 | 8.91 | 3.19 |
| Acetone | 5.47 | 4.00 | | |

The novel solvents of my invention also possess other properties which make them very useful as solvents for acetylene. Some of these properties are given in Table III.

TABLE III

*Properties of solvents*

| Solvent | Dimethyl cyanamide | Diethyl cyanamide |
| --- | --- | --- |
| Molecular Weight | 70.09 | 98 |
| Boiling Point, °C | 160 | 186 |
| Vapor Pressure, @ 30° C., mm | 5.0 | |

In an acetylene recovery process, the acetylene-containing effluent stream is subjected to countercurrent scrubbing in any suitable absorbent tower, such as a spray, packed, or bubble plate tower. The solvent need not be a pure compound and may be admixed with other acetylene solvents, or liquid materials which have no selective solvent action on acetylene. The temperatures and pressures employed may vary over wide limits but very often ordinary temperatures and pressures are used. It is preferred to operate at a temperature substantially below the boiling point of the solvent and above the dew-point of the gaseous mixture at the existing pressure. At very low temperatures, for a fixed pressure, the solubility of acetylene is increased, but the solubility may be so great that lower selectivity is obtained; whereas, at high temperatures so little acetylene may be dissolved that selectivity is of little consequence. The use of super-atmospheric pressure improves the capacity of the solvent for acetylene, but requires more expensive equipment. The acetylene selectively absorbed in the solvent along with small amounts of other gases, is recovered by either heating the solution to expel the gas, reducing the pressure over the solution to effect a separation of the dissolved gas, or by using a combination of both features. Thereafter, the solvent is recirculated in the system.

Variations and modifications are possible within the scope of the disclosure of the present invention, the essence of which is that dialkyl cyanamides have been discovered to be effective selective solvents for separating unsaturated hydrocarbons from less unsaturated hydrocarbons and particularly for separating acetylene from mixtures containing acetylene, olefins, paraffins, and carbon dioxide.

I claim:

1. The process of separating a normally gaseous unsaturated hydrocarbon selected from the group consisting of acetylene, ethylene, propylene and butylene from a normally gaseous less unsaturated hydrocarbon selected from the group consisting of methane, ethylene, ethane, propylene, propane, butylene, and butane which comprises contacting said hydrocarbons with a dialkyl cyanamide wherein each alkyl radical contains not more than 3 carbon atoms.

2. The process of claim 1 wherein the unsaturated hydrocarbon is acetylene and the less unsaturated hydrocarbon comprises ethylene, ethane, and methane in a gaseous mixture.

3. The process of claim 1 wherein the unsaturated hydrocarbon is an olefin and the less unsaturated hydrocarbon comprises paraffins.

4. The process of claim 3 wherein the olefin is ethylene.

5. The process of removing acetylene from the normally gaseous effluent of a hydrocarbon reaction process wherein acetylene is present as a minor constituent in admixture with hydrogen, methane, ethylene and nitrogen, which comprises contacting said gaseous effluent with a dialkyl cyanamide wherein each alkyl radical contains not more than 3 carbon atoms.

6. The process of claim 1 wherein the dialkyl cyanamide is dimethyl cyanamide.

7. The process of claim 1 wherein the dialkyl cyanamide is diethyl cyanamide.

8. The process of claim 1 wherein the dialkyl cyanamide is methylethyl cyanamide.

9. The process of claim 1 wherein the dialkyl cyanamide is diisopropyl cyanamide.

10. A composition of matter which consists essentially of acetylene dissolved in a dialkyl cyanamide wherein each alkyl radical contains not more than 3 carbon atoms.

11. The composition of claim 10 wherein the dialkyl cyanamide is dimethyl cyanamide.

12. The composition of claim 10 wherein the dialkyl cyanamide is diethyl cyanamide.

13. The composition of claim 10 wherein the dialkyl cyanamide is diisopropyl cyanamide.

14. The composition of claim 10 wherein the dialkyl cyanamide is methylethyl cyanamide.

15. A package which comprises a pressure resistant container, an adsorbent material, a dialkyl cyanamide, wherein each alkyl radical contains not more than 3 carbon atoms, and acetylene.

16. The package of claim 15 wherein the dialkyl cyanamide is dimethyl cyanamide.

17. The package of clami 15 wherein the dialkyl cyanamide is diethyl cyanamide.

18. The package of claim 15 wherein the dialkyl cyanamide is methylethyl cyanamide.

19. A method for the storage of acetylene which comprises dissolving acetylene in a dialkyl cyanamide, wherein each alkyl radical contains not more than 3 carbon atoms, and confining a resulting solution in a storage zone.

20. The process of purifying an ethylene stream containing acetylene as an impurity which comprises contacting said ethylene stream in the gaseous phase with a dialkyl cyanamide, wherein each alkyl radical contains not more than 3 carbon atoms.

21. The process of removing and recovering acetylene from a gaseous mixture containing acetylene, normally gaseous olefins, normally gaseous paraffins, and carbon dioxide which comprises contacting said gaseous mixture with a dialkyl cyanamide wherein each alkyl radical contains not more than 3 carbon atoms at a temperature below the boiling point of the dialkyl cyanamide and above the dew point of the gaseous mixture.

References Cited in the file of this patent

UNITED STATES PATENTS 1,813,946    Nicodemus _____ July 14, 1931